3,164,480
MANUFACTURE OF MEAT-CURING SALT COMPOSITION
Louis Sair, Evergreen Park, and George R. Reschke, Palos Park, Ill., assignors to The Griffith Laboratories, Inc., Chicago, Ill., a corporation of Illinois
No Drawing. Filed Feb. 19, 1964, Ser. No. 344,464
13 Claims. (Cl. 99—222)

The present invention relates to a granular curing salt composition containing a major proportion of homogeneous sodium chloride crystals and a minor proportion of nitrogen-containing salt selected from the group consisting of alkali-metal nitrite, alkali-metal nitrate, and mixtures thereof.

Curing salt compositions are commonly shipped in large drums from a supplier to a meat packer, who removes portions from the drums for immediate use. For a long time past, such compositions were made by mechanically mixing crystals of the separate salt ingredients. Complaints by government control authorities arose as a result of using such a mixture. The content of the nitrite salt used in curing is limited by such authorities. It was ascertained that in shipping and in distributing such bulk quantities of the mechanical mixture, gravitational separation frequently took place with the result that there were formed portions relatively deficient and relatively richer in nitrite salt. Use of the richer portions resulted in excess use of nitrite in the curing process.

It is known that when such a mixture is very finely ground, the danger of separation is minimized, but other difficulty is encountered. Very fine particles tend to cake merely due to their size. This tendency makes the particles less mobile, thus minimizing separation. The longer such a fine-ground mass stands, the harder it cakes, making it more difficult to remove a portion of the cake for use.

It has been found that the ingredients as a mechanical mixture can be bonded to a unified form by effective mechanical pressure, so that the unified form may be reduced to desired sizes for various commercial practices without a change of composition.

It is the general object of the invention to produce a granular mass of polycrystalline aggregates consisting essentially of homogeneous sodium chloride crystals and the selected nitrogen-containing curing salt.

It is a particular object of the invention to prepare a granular salt composition of the type described with a particle-size-distribution such that all the size-fractions thereof are substantially uniform in chemical composition.

It is a particular object of the invention to produce a free-flowing granular form of such a composition.

The preferred process is to prepare a finely-divided or fine-ground uniform mixture containing the salt ingredients, mechanically to apply pressure in a manner to produce caked forms of the mixture, and then comminute the mixture to provide a granular mass of heterogeneous particles of the caked forms of size such that all the particles have a composition substantially like that of the initial mixture.

To achieve the desired results a uniform mixture, which is suitably finely-divided or fine-ground, is purposely caked or agglomerated to eliminate the small-size particles and to bond the mass to a unified whole. Cake or caked forms are thus produced. When a granular free-flowing product is desired the agglomerated material is ground or comminuted to a desired fineness short of one which cakes on standing, and preferably to a fineness coarser than the particle-size-distribution of the material subjected to compaction. Comminution is best done and controlled by passing the cake through the nip of grinding rolls set apart to control the size. Several passes are preferred, as by passing the material through a bank of such set rolls, for example, three in number, each following set being more closely spaced. Preferably, the comminution is effected on the caked forms which are dry or which have not more than 2% content of moisture, and preferably less than 1% content of moisture.

Caking may be effected in one way by mechanically squeezing together the particles of a fine-ground mixture. This may be done by mechanically compressing the individual original crystals into sheet, cake, pellet, or briquette form.

One way is to extrude a rod-like form and to chop off pellets as extruded. Another way is to pass a mass of the original crystals through the nip of heavy compression rolls, exerting heavy pressure, so that sheet-like forms are produced of thickness, for example 1/16 to 1/8-inch. Such forms may be further fragmented to facilitate further comminution as described.

In curing meat a considerable quantity of sodium chloride is used with a small quantity of curing salt. It is a conventional practice to compound sodium chloride and the curing salt for use as an ingredient in processing meat, usually supplemented by additional sodium chloride. Therefore, the composition of the present invention has no more sodium chloride combined with the curing salt than is to be used for the meat with the curing salt content.

A typical curing salt composition permitting use of supplemental sodium chloride is chosen for the purpose only of illustration, as follows:

| | Parts by weight |
|---|---|
| Sodium chloride | 90 |
| Sodium nitrite | 6 |
| Sodium nitrate | 4 |

This composition is hereinafter referred to as "90–6–4." Nitrite salt is the chief ingredient with which certain Federal regulations are concerned, and the uniformity of the composition as referred to in the present application is measured by reference to the nitrite content. In the typical composition given above, the theoretical content of nitrite is 6%. The Federal regulations, in recognition of problems in manufacture, permit deviations up to 10% from the theoretical content, when the theoretical amount is 6%, but permits greater deviation when the theoretical amount of nitrite is less, being for example 15% when the theoretical amount is 2%.

Commercial homogeneous sodium chloride (NaCl) crystals are available in different grades of fineness, identified as fine salt, fine flake salt, and flake salt. Table I below shows the particle-size-distribution of these three salt grades and of commercial sizes of nitrate and nitrate salt crystals.

Table I

| Ingredient | Percent of Fractions — Mesh Sieve | | | |
|---|---|---|---|---|
| | On 50 | On 100 | On 200 | Thru 200 |
| Fine Salt | 0 | 53 | 37 | 10 |
| Fine Flake Salt | 11 | 84 | 4 | 1 |
| Flake Salt | 86 | 11 | 1 | 2 |
| Sodium Nitrite | 40 | 52 | 5 | 3 |
| Sodium Nitrate | 9 | 22 | 20 | 49 |

The above salt supplies were blended to a 90-6-4 composition and the blend fractionated on the same set of screens. The nitrite contents of the fractions are given in Table II which shows poor uniformity in chemical composition, indicative of separation in shipping.

Table II

| Composition No. | | Percent Nitrite Salt in Fractions | | | |
|---|---|---|---|---|---|
| | NaCl | On 50 | On 100 | On 200 | Thru 200 |
| 1 | Fine | 79 | 9.8 | 1.2 | 1.1 |
| 2 | Fine Flake | 11.7 | 4.4 | 2.7 | 2.2 |
| 3 | Flake | 4.0 | 8.6 | 6.0 | 3.6 |

Mechanical mixtures of 90-6-4 were made using the same grades of sodium chloride crystals and finer grades of the nitrite and nitrate salts, of which the particle-size-distributions are given in Table III.

Table III

| Ingredient | Percent in Fractions | | | |
|---|---|---|---|---|
| | On 50 | On 100 | On 200 | Thru 200 |
| Fine Salt | 0.1 | 29 | 63 | 8 |
| Fine Flake Salt | 12 | 76 | 11 | 1 |
| Flake Salt | 82 | 16 | 1 | 0.2 |
| Sodium Nitrite | 0 | 0.3 | 7 | 93 |
| Sodium Nitrate | 0 | 2 | 13 | 85 |

These mechanical mixtures were then fractionated on the same screens and the nitrite contents of the fractions determined. The compositional uniformity of the fractions was improved by the finer grinding of the nitrite and nitrate salts, but not sufficiently for the required standards, as shown in Table IV.

Table IV

| Composition No. | | Percent Nitrite Salt in Fractions | | | |
|---|---|---|---|---|---|
| | NaCl | On 50 | On 100 | On 200 | Thru 200 |
| 4 | Fine | 5.7 | 5.1 | 3.9 | 7.0 |
| 5 | Fine Flake | 5.6 | 4.1 | 3.6 | 7.6 |
| 6 | Flake | 5.0 | 4.5 | 4.4 | 8.2 |

The following Table V shows that a substantially uniform composition may be made by very fine grinding of a 90-6-4 composition No. 7. However, such a fine-ground mixture cakes and is commercially unsatisfactory. Table V shows the particle-size-distribution in percent for each fraction and the nitrite content of each fraction.

Table V

| Fraction | Fine Mixture — Composition No. 7 | |
|---|---|---|
| | Percent of Whole | Percent Nitrite |
| On 150 Mesh | 1 | 5.85 |
| On 200 Mesh | 10 | 6.65 |
| On 270 Mesh | 22 | 6.15 |
| Thru 270 Mesh | 66 | 6.05 |

According to the present invention, a fine-ground caking mixture such as Composition No. 7 (Table V) can be compacted or agglomerated into caked forms, which caked forms may be comminuted to particle sizes coarser than the original mass. Compaction is illustrated by use of those ingredients of which the particle-size-distribution is shown in Table I. Compositions Nos. 8, 9 and 10 were made with the ingredients of Table I, and were compacted and then ground to sizes having particle-size-distributions with fractions of nitrite salt content shown in Table VI.

Table VI

| Composition No. | | Percent Nitrite Salt in Fractions | | | |
|---|---|---|---|---|---|
| | NaCl | On 50 | On 100 | On 200 | Thru 200 |
| 8 | Fine | 6.9 | 6.4 | 3.5 | 4.7 |
| 9 | Fine Flake | 6.1 | 5.8 | 4.3 | 5.8 |
| 10 | Flake | 6.4 | 6.0 | 4.7 | 4.8 |

The nitrite uniformity of Table VI does not meet said Federal standards, but it is greatly improved over that shown in Table II.

The present invention may be used to eliminate the tendency to cake of a mixture such as Composition No. 7 of Table V. The finely ground Composition No. 7 was divided into four batches. These were compacted dry, with 1% added water, with 2% added water, and with 4% added water. The four compositions were then dried to not more than 1% moisture and ground to a size coarser than the original mass. The four dried comminuted compositions of 90-6-4 have weight-fractions with nitrite content as shown in Table VII.

Table VII

| Composition No. | Percent $H_2O$ | | Particle Size | | | |
|---|---|---|---|---|---|---|
| | | | On 50 | On 100 | On 200 | Thru 200 |
| 11 | 0 | Percent Content | 54 | 28 | 5 | 13 |
| | | Percent Nitrite | 6.10 | 5.99 | 6.05 | 6.05 |
| 12 | 1 | Percent Content | 61 | 24 | 4 | 10 |
| | | Percent Nitrite | 6.05 | 6.06 | 5.95 | 5.95 |
| 13 | 2 | Percent Content | 55 | 24 | 7 | 14 |
| | | Percent Nitrite | 6.06 | 5.98 | 6.05 | 6.05 |
| 14 | 4 | Percent Content | 57 | 23 | 7 | 13 |
| | | Percent Nitrite | 6.03 | 5.99 | 6.04 | 6.02 |

By finely grinding a mixture of sodium chloride, sodium nitrite and sodium nitrate, followed by compaction to bonded caked forms, and then by size-reduction of the caked forms which have not more than 2% by weight of water, it is possible to produce a product having particles which preferably are coarser than the original particles compacted, which have substantially the same composition in the coarsest fraction and in the finest fraction. The uniformity meets the most rigid requirements and can be within 2% deviation from the theoretical content.

The mesh data shown in Table V is typical of a fine grind which will cake on standing, while the mesh data of Table VII shows a particle-size-distribution of sufficient coarseness so that the composition is free-flowing indefinitely.

The compositions shown in Table VII were compacted between rolls urged together by a force of 5400 pounds per linear inch of roll. In Table VIII below, the same Composition No. 7 of Table V was compacted at a higher pressure corresponding to a force of 9000 pounds per linear inch of roll, otherwise using the same conditions.

The products of Table VIII are also acceptable. Tables VII and VIII show that with a suitably fine original mixture, the pressure of compaction and the content of water are not critical.

Experience has shown that as the original mix is made coarser, the tendency is to make unacceptable products, and that this tendency may be compensated for by increasing the moisture content, or by increasing the pressure, or by both. This is shown in Tables IX and X. Table IX shows a coarser original mix than is shown in Table V.

*Table VIII*

| Composition No. | Percent H$_2$O | | Particle Size | | | |
|---|---|---|---|---|---|---|
| | | | On 50 | On 100 | On 200 | Thru 200 |
| 15 | 0 | Percent Content | 50 | 15 | 14 | 21 |
| | | Percent Nitrite | 5.85 | 5.85 | 5.85 | 5.85 |
| 16 | 1 | Percent Content | 49 | 17 | 14 | 20 |
| | | Percent Nitrite | 6.05 | 6.05 | 5.85 | 6.30 |
| 17 | 2 | Percent Content | 48 | 14 | 13 | 24 |
| | | Percent Nitrite | 5.95 | 5.95 | 6.00 | 6.00 |

*Table IX*

| Mesh | Percent in Fractions | |
|---|---|---|
| | Salt | Nitrite |
| On 50 | 0.2 | |
| On 100 | 22 | 1.09 |
| On 200 | 63 | 2.70 |
| Thru 200 | 15.4 | 24.0 |

In Table X, Compositions Nos. 23 and 24 are substantially uniform in chemical composition in all size fractions.

*Table X*

| Composition No. | H$_2$O | Pressure[1] | | Particle Size | | | |
|---|---|---|---|---|---|---|---|
| | | | | On 50 | On 100 | On 200 | Thru 200 |
| 18 | 0 | 9,000 | Percent Content | 52 | 16 | 15 | 16 |
| | | | Percent Nitrite | 5.50 | 5.30 | 4.30 | 6.60 |
| 19 | 1 | 9,000 | Percent Content | 48 | 15 | 16 | 21 |
| | | | Percent Nitrite | 5.95 | 5.89 | 4.95 | 6.60 |
| 20 | 2 | 9,000 | Percent Content | 44 | 14 | 16 | 25 |
| | | | Percent Nitrite | 5.93 | 6.08 | 4.90 | 6.25 |
| 21 | 0 | 14,500 | Percent Content | 46 | 17 | 17 | 20 |
| | | | Percent Nitrite | 5.75 | 5.30 | 4.30 | 6.65 |
| 22 | 1 | 14,500 | Percent Content | 42 | 16 | 17 | 25 |
| | | | Percent Nitrite | 5.85 | 5.85 | 4.90 | 6.65 |
| 23 | 2 | 14,500 | Percent Content | 48 | 15 | 15 | 22 |
| | | | Percent Nitrite | 5.85 | 6.08 | 5.45 | 6.60 |
| 24 | 4 | 14,500 | Percent Content | | 16 | 54 | 30 |
| | | | Percent Nitrite | | 5.90 | 6.10 | 5.80 |

[1] Force in pounds per linear inch of roll.

Another illustration of the effect of water is shown in Tables XI and XII. A composition 90-6-4 is ground to the size shown in Table XI, having fractions which are non-uniform in nitrite content.

*Table XI*

| Mesh | Percent Salt | Percent Nitrite |
|---|---|---|
| On 50 | 0 | 0 |
| On 100 | 11.2 | 23.0 |
| On 200 | 69.0 | 3.1 |
| Thru 200 | 20.0 | 12.0 |

Table XII shows the sizes and nitrite content of the above mixture of Table XI, compacted dry and with 2% added water, and then dried and ground, all under the same conditions except as to water.

*Table XII*

| Composition No. | Percent H$_2$O | | Particle Size | | | |
|---|---|---|---|---|---|---|
| | | | On 50 | On 100 | On 200 | Thru 200 |
| 25 | 0 | Percent Content | 46 | 15 | 17 | 22 |
| | | Percent Nitrite | 5.80 | 5.55 | 4.10 | 6.90 |
| 26 | 2 | Percent Content | 55 | 16 | 14 | 16 |
| | | Percent Nitrite | 5.80 | 6.05 | 5.40 | 6.15 |

Composition No. 26 is acceptable in uniformity.

From the foregoing it is to be understood that the trends for a uniform product are (1) the finer the grind of the original mixture, (2) the presence of some water content, and (3) the increase of pressure in compaction. All these factors are so related that critical bounds for all of them cannot be set, because a variation of only one factor shifts the ranges for the other factors.

Although it is preferable to grind the compacted material to a particle-size-distribution which is coarser than that of the original mass for certain uses, it may be desirable to grind it to a form finer than that of the original mixture for other uses. The references herein to the particle-size-distribution of the original mass must be considered in connection with the fact that during compaction crystals are fractured by the high pressure in order to produce forms to fill the intercrystal voids.

Since it is not possible to determine the extent to which the original mixture is thus changed in particle size by compaction, it is obvious that the pressure employed in compaction fractures to a greater extent as the pressure is increased. Therefore, in using, say a coarser mixture and very high pressure, the result may be the same as some other circumstance in which a finer original mixture and a lower pressure are employed.

By specifying that the bonded cakes are reduced to a granular form coarser than the original mixture, it is practically assured that the desired uniformity of composition in the size-fractions will be achieved, because of the fracturing of the original mixture to smaller size by compacting as described above.

The invention is not limited in saleable products to those which contain the entire product of grinding a compacted mass. Since the final product has fractions of graded sizes, any grind may be fractionated to select from its fractions a composition of one or more fractions within a predetermined range of particle sizes. Such fractions as are rejected in doing this may be used as a raw material for recycling through the compaction procedure, whether they be at the coarser end or at the finer end. In consequence, the original mass may be, or may include, particles which are aggregates of the component salts.

The invention is not limited to mixing the separate crystals of sodium chloride, separate crystals of nitrite salt, and separate crystals of nitrate salt. However, that is preferred because such salts are commercially available to supply the raw materials. The presence of a limited amount of water is preferred to facilitate the bonding. The nitrite and nitrate salts are more readily dissolved by added water than are the sodium chloride crystals. Thus, the original mixture when compacted may contain a dissolved quantity of the selected salt. The solution lubricates the mass for compaction and provides bond on drying to hold the several different homogeneous particles in a bonded agglomerate. However, excess water should be avoided. The maximum amount is controlled so that it is not exuded during compaction.

The nitrite and nitrate salts may be combined into a physically homogeneous fusion product, and that product used to supply the two salts.

The following Table XIII gives the fusion points of such salts, and of certain mixtures thereof.

*Table XIII*

| Substance | Approximate Melting Point, °C. |
|---|---|
| Potassium nitrate | 337 |
| Potassium nitrite | 297.5 |
| Sodium nitrate | 308 |
| Sodium nitrite | 271 |
| Sodium chloride | 804 |
| Mixed: | |
| Sodium nitrite 60% | } 230 |
| Sodium nitrate 40% | |
| Mixed: | |
| Sodium nitrite 60% | |
| Potassium nitrate 40%. | |
| Begins to melt at | 126 |
| and is completely liquid and transparent at | 156 |
| Mixed: | |
| Potassium nitrite 60%. | |
| Sodium nitrate 40%. | |
| Begins to melt at | 139 |
| and is completely liquid and transparent at | 172 |

There are some peculiar facts about the fusion points of mixtures. When dry nitrites and nitrates are mixed for fusion, the melting point is sharp when the same metal base, such as sodium, is used in both salts. When the metal bases differ, the melting point is spread over a wide range. This is believed due to a shifting of the equilibrium between the two salts forming perhaps four salts. It is also noted that where the metal bases differ the melting point is lower than when the metal base is the same for both salts.

The following example shows the invention practiced with a fusion to provide a 90-6-4 composition.

A solid fusion of 6 parts of sodium nitrite and 4 parts of sodium nitrate is mixed with 90 parts of sodium chloride. The two components may be separately ground, or the mixture may be ground so that all passes a 100-mesh screen. The fine ground mass is then compacted to cake form. When the irregular caked forms are desired in a granular free-flowing state, they are so ground that all passes a 30-mesh screen, 50% remains on a 50-mesh screen, and about 10% passes a 200-mesh screen. Such fractions are substantially uniform in nitrite content.

In carrying out the invention, the caked forms need not be ground or comminuted to produce a granular product, there being no limit to the maximum size. For example, the chopping off of pellets from a continuous extrude can be accomplished so that the pellets, being fractured caked forms, are all of substantially the same size, so as to form a granular mass. When pellets are so formed, any water in the pellets may be removed thereafter, and then if sizes smaller than said pellets are desired the dried pellets may be reduced to the desired granular form. When a free-flowing granular form is desired, the caked forms may be ground to coarse sizes, even such as rock salt, to serve the mechanical purposes of the users. It is noted, however, that the invention has been explained and exemplified by reference to an ultimate fineness much greater than need be practiced.

A granular form of curing salt of moderate fineness is the form desired by the meat packers, not only for mixing it directly in products for ground meat and for rubbing onto meat, but also for ready weighing and dissolution in forming brine.

The composition which is the subject of the present invention may contain additives, such as cane sugar, corn sugar, phosphate salts, alkaline agents, and seasoning, which function in the treatment of meat.

The invention is not limited to or by the details and examples given above to illustrate and explain the invention, and numerous changes and modifications are contemplated as falling within the scope of the invention as expressed in the appended claims.

This application is a continuation-in-part of Serial No. 209,216, filed July 11, 1962, now abandoned.

We claim:

1. The method of producing a curing salt composition which method comprises forming an initial free-flowing particulate mass having up to 4% by weight of water which mass is substantially uniform in composition by combining with a major proportion of homogeneous sodium chloride crystals a minor proportion of salt selected from the group consisting of alkali-metal nitrite, alkali-metal nitrate, and mixtures thereof, the sodium chloride being present in amount not over that to be used with the curing salt content, bonding said mass to cake forms by application of effective mechanical pressure, and reducing the size of said caked forms which have not more than 2% by weight of water to provide a granular mass of compaction-bonded agglomerates of such particle-size-distribution that all the size-fractions thereof have a substantially uniform content.

2. The method of claim 1 in which the caked forms are substantially dry when reduced in size.

3. The method of claim 1 in which said initial mass is characterized by a particle-size-distribution of which the size-fractions are non-uniform in chemical content.

4. The method of claim 1 wherein the initial mass contains from 1 to 4% by weight of water.

5. The method of claim 1 in which said selected salt comprises physically homogeneous particles thereof.

6. The method of claim 1 in which said initial mass is formed from physically homogeneous particles of said selected salt and from 1 to 4% by weight of water.

7. The method of claim 1 in which the initial mass is in finely divided granular form and in which the caked forms are reduced in size to a particle-size-distribution much coarser than said mass.

8. The method of claim 1 in which the selected salt comprises separate crystals of alkali-metal nitrite and of alkali-metal nitrate.

9. The method of claim 1 in which the selected salt comprises particles of a physically homogeneous fusion mass of alkali-metal nitrite and alkali-metal nitrate.

10. The method which comprises forming an initial free-flowing finely-divided granular curing salt mixture of substantially uniform composition, which composition comprises salt components consisting essentially of a major proportion of homogeneous sodium chloride crystals and a minor proportion of physically homogeneous particles of salt selected from the group consisting of alkali-metal nitrite, alkali-metal nitrate and mixtures thereof, the sodium chloride being present in amount not over that to be used with the curing salt content, said initial mixture having a particle-size-distribution of which graded fractions differ greatly in content of selected salt, bonding said mixture to caked forms of the same composition by application of effective mechanical pressure, and reducing the size of said caked forms to a granular mass of compaction-bonded heterogeneous agglomerates of different physically homogeneous particles which mass has a substantially uniform composition and a particle-size-distribution of average size greater than that of said initial mixture.

11. The method of claim 10 in which a small amount of water is present in the initial mixture subjected to mechanical pressure.

12. The method of claim 10 in which not over 2% of moisture is present in the caked forms when reduced in size.

13. The method of claim 10 in which a small amount of water in excess of 2% is present in the mixture subjected to mechanical pressure, and in which the caked forms are dried to not over 2% of moisture for reducing the sizes thereof.

References Cited by the Examiner

UNITED STATES PATENTS

| | | | |
|---|---|---|---|
| 2,054,624 | 9/36 | Griffith | 99—159 X |
| 2,054,625 | 9/36 | Griffith | 99—159 X |
| 2,054,626 | 9/36 | Griffith | 99—159 |
| 2,145,417 | 1/39 | Hall | 99—222 |
| 2,400,292 | 5/46 | Dalton. | |
| 2,668,770 | 2/54 | Hall | 99—159 X |
| 2,668,771 | 2/54 | Hall | 99—159 X |
| 2,770,548 | 11/56 | Hall et al. | 99—159 X |
| 2,770,549 | 11/56 | Hall | 99—159 X |
| 2,770,550 | 11/56 | Hall et al. | 99—159 X |
| 2,770,551 | 11/56 | Hall et al. | 99—159 X |
| 2,828,212 | 3/58 | Sair | 99—159 X |
| 2,935,387 | 5/60 | Phillips | 71—64 X |
| 2,977,214 | 3/61 | McLellan | 71—64 |
| 3,098,767 | 7/63 | Bush | 127—63 |

A. LOUIS MONACELL, *Primary Examiner.*

HYMAN LORD, *Examiner.*